July 20, 1965        R. L. LOSSMAN        3,195,919
REMOVABLE TRAILER CHASSIS FOR BOATS AND THE LIKE
Filed May 21, 1963
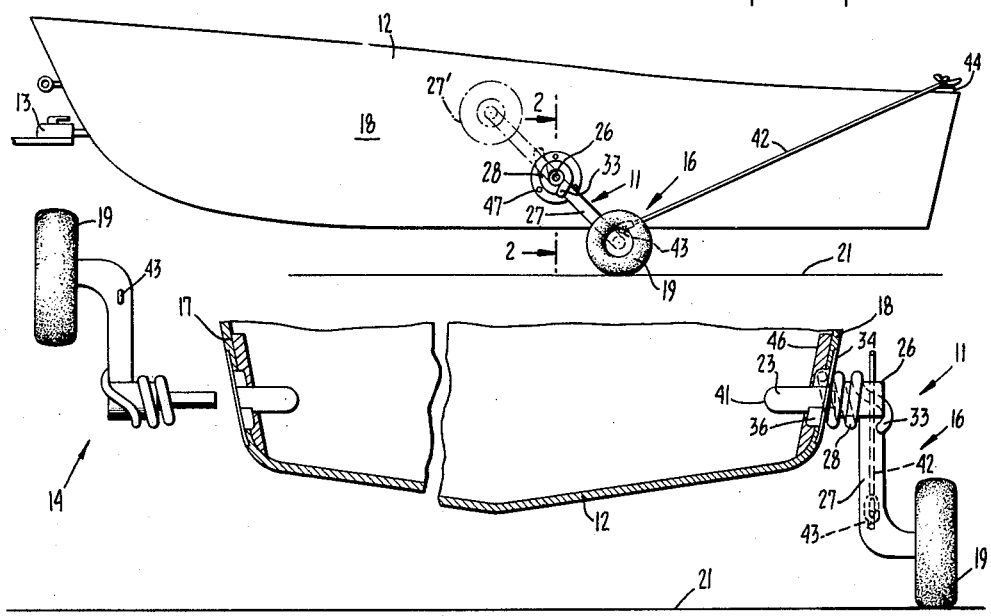
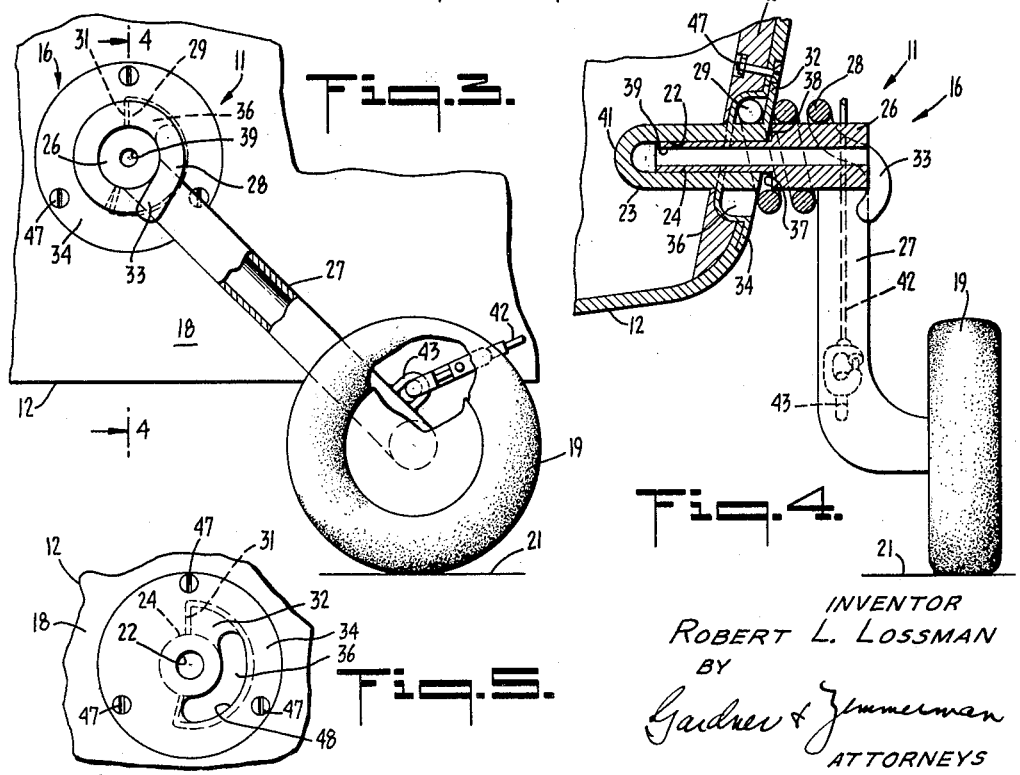
INVENTOR
ROBERT L. LOSSMAN
BY
Gardner & Zimmerman
ATTORNEYS United States Patent Office 3,195,919
Patented July 20, 1965

3,195,919
REMOVABLE TRAILER CHASSIS FOR
BOATS AND THE LIKE
Robert L. Lossman, Berkeley, Calif.
(246 Jersey St., San Francisco, Calif.)
Filed May 21, 1963, Ser. No. 282,019
6 Claims. (Cl. 280—124)

This invention relates generally to a chassis for a trailer or similar vehicle, and more particularly to a chassis that can be selectively removed from the trailer.

It is generally conventional practice in transporting boats over land to support the boat on a trailer, and tow the trailer by an automobile or other draft vehicle. The use of a separate trailer is undesirable in several respects. In the instance of relatively small and lightweight boats, the expense of the trailer may often approach or exceed the cost of the boat itself. Consequently, lightweight boats sometimes will be mounted on top of an automobile or station wagon in order to transport them over land. While avoiding the need for a trailer, this practice has disadvantages which include high wind drag against the vehicle's movement. Also, it is a generally cumbersome procedure to place the boat on top of and remove it from the vehicle which in many instances involves further the mounting and removal of an outboard motor. Additional disadvantages in the use of a separate trailer are that the trailer must be parked when not in use. Also, in putting a boat on a trailer, much care must be used in properly positioning the boat on and securing it to the trailer. Often special winches are on the trailer to aid in positioning the boat.

Accordingly, it has been found useful to provide a chassis that is directly mounted on the boat itself, thus eliminating the need and disadvantages of a separate trailer. Further advantage to be gained by the directly mounted chassis is that the boat when on land is more easily moved around by one person, because of the reduced combined weight. Also, the boat can be easily elevated to a raised storage position in a garage, with no further problem as to storage of the trailer. Some chassis of this type are adapted to be moved into an inoperable position when the boat is in use, as for example, by lifting the wheels out of the water. This arrangement, however, involves the bulk of the chassis and wheels remaining attached to the boat, thus inhibiting the general movement in and use of the boat.

Other arrangements have been adapted to have the wheels and chassis completely removable from the boat. While these structures generally have improved over the disadvantages of earlier arrangements, they were nevertheless accompanied by various other disadvantages. Many such devices are relatively complicated to mount or remove from the boat, particularly when it is considered that this operation is most frequently performed while the boat is in the water. Furthermore, such devices have required undesirable protuberances extending inwardly and/or outwardly of the boat, thus limiting the usable space and causing drag against the boat's movement in the water. Also, prior devices have generally involved relatively complex structures, requiring many parts, thus inhibiting their commercial usefulness.

Accordingly, it is an important object of the present invention to provide a detachable chassis for a trailer, boat, or similar vehicle, which enables the chassis to be removed from or mounted on the vehicle in a ready and simple manner, and which enables visual inspection of the chassis parts to assure that they are locked in proper position when being mounted.

Another object of the invention is to provide a detachable chassis of the character described, wherein the extent of protuberances on the interior of the vehicle is significantly reduced over prior devices, thus affording increased usable space in the vehicle's interior.

A further object of the invention is to provide a detachable chassis of the character described, wherein the sides of the vehicles have no outward projections when the chassis is removed, and which requires an opening of only minimal size on the side of the vehicle.

Still another object of the invention is to provide a detachable chassis of the character described, which involves a smaller number of parts than has been heretofore used in other devices, thus enabling it to be manufactured more simply and economically.

An even further object of the invention is to provide a detachable chassis of the character described, wherein the axial movement of the chassis relative to the vehicle is restrained to minimize lateral swaying of the vehicle when being towed.

Another object of the invention is to provide a detachable chassis of the character described, which affords spring suspension to cushion the road shock to the vehicle when towed over land, and which is arranged to assure that the spring does not lose its resilient characteristics under heavy loading.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawings:

FIGURE 1 is a side elevation view of a boat having mounted thereon a detachable chassis forming an embodiment of the present invention.

FIGURE 2 is a transverse cross-sectional view of the structure shown in FIGURE 1 taken along the plane 2—2 shown therein, with one wheel assembly in position as mounted on the boat and with the other wheel assembly shown prior to being mounted.

FIGURE 3 is a detailed side view of the instant chassis similar to the view of FIGURE 1.

FIGURE 4 is a cross sectional view taken along the plane 4—4 in FIGURE 3.

FIGURE 5 is a side view similar to FIGURE 3, but with the detachable portion of the instant chassis removed.

In broad terms, the present invention is embodied in a chassis 11 suitable for use in conjunction with a boat 12 or similar vehicle to adapt such vehicle for travel over 13, thus enabling it to be hooked to a suitable draft vehicle (not shown) for towing the boat while the latter is supported on the chassis 11. As best shown in FIGURE 2, the instant chassis includes a pair of chassis assemblies 14 and 16, with one being mounted respectively on either side 17, 18 of the boat 12. Each chassis is adapted to carry a rotatably mounted wheel 19 for bearing on a ground surface 21 and transporting the boat 12 thereon. Inasmuch as the assemblies 14 and 16 are substantially symmetrical and identical, further description herein of the chassis 11 relates only to the assembly 16.

As generally regards the chassis assembly 16, means are provided defining a substantially horizontally disposed bore 22 adjacent the side 18 of the boat. Such bore may be formed substantially integrally with the side of the boat as for example with an all aluminum boat, or, as shown with the embodiment in the drawings, a tubular cylindrical member 23 can be mounted on the boat in the form of an attachment. A stub shaft 24 is disposed in the bore 22 for rotation therein about its axis, and has an outer portion 26 extending outwardly from the bore. A wheel support arm 27 is secured adjacent the outer end of the shaft 24, and is disposed substantially transversely thereto. The wheel 19 is carried on the support arm 27. A helical coil spring 28 is disposed concentrically about the outer shaft portion 26 in generally close fitting relation therewith, and is adapted to support the arm 27 in the angular position shown in FIGURES 1 and 3.

In more detail now, means are provided for restraining the innermost end portion 29 of the spring 28 against rotation in one direction about the shaft portion 26, and more specifically against counterclockwise rotation as viewed in FIGURE 3. Such means preferably includes a stop or end wall portion 31 mounted on the boat and adapted to abut the end of the spring portion 29. Further means are provided to restrain the portion 29 against axially outward movement relative to the bore 22, and which as shown consists of the radially extending wall member 32 adapted to engage the end portion 29 of the spring. The members 31 and 32 are described in more detail hereinafter.

The outermost end portion 33 of the spring 28 is adapted to engage the outer end portion of the shaft 24 and the adjacent portion of the support arm 27, whereby the spring 28 is restrained against rotation in a clockwise direction about the shaft 24 as shown in FIGURE 3. More specifically the outer portion 33 is provided with a generally bent hook shape as is best shown in FIGURES 2 and 4. In addition to restraining the spring against clockwise relative movement to the shaft, the portion 33 further restrains the shaft against axially outward movement relative to the spring. Thus, with the spring 28 disposed as shown in the drawings, it will be placed under rotational forces when the wheel support arm is moved to the angular position shown, and the weight of the boat bears downwardly on the chassis. More particularly, the weight of the boat tends to urge counterclockwise rotation of the wheel support arm 27, which in turn applies clockwise force to the spring at its outermost portion 33. The torque on the spring is brought to bear against the said wall stop 31, which restricts the spring against counterclockwise rotation. It is noted that the enlarged outer shaft portion 26 fits closely within the spring 28 and supports the spring to prevent it from being bent under the untwisting rotational forces.

As more particularly regards the radially extending wall member 32 and end wall stop 31, the preferred embodiment of the invention, as shown, includes a plate member 34 mounted flush with the side 18, and formed substantially integrally with the tubular member 23. The plate 34 defines a generally arcuate shaped recessed portion 36, best seen in FIGURE 5, which extends along a generally circular centerline disposed concentrically about the tubular member 23. The recessed portion is in general alignment with the spring 28, and is adapted to receive the innermost end portion 29 of the spring as will be described. The end wall stop 31 is seen to be disposed transversely adjacent one end of the recessed portion 36, with the radially extending wall 32 disposed over the segment of the recessed portion 36 in spaced relation therewith and adjacent the end wall 31. Thus, the end portion 29 of the spring can be inserted into the recess into restrained relationship with the members 31 and 32, restricting the spring against counterclockwise rotational movement and outwardly axial movement. It is noted that the arcuate recess 36 extends for about a half segment of a circle. This serves to accommodate ready insertion of the spring end 29 into engagement with the wall members 31 and 32, as will be described more fully.

The outer shaft portion 26 is seen to include an inner shoulder 37, which abuts against the outer end 38 of the tubular member 23 to limit inwardly axial movement of the shaft. Such provision restrains against lateral swaying of the boat relative to the wheels. A longitudinal bore 39 extends through the shaft 24 to allow evacuation of air from the bore 23 as the shaft is inserted therein, inasmuch as the member 23 is provided with an end wall 41 to seal the interior of the boat. A flexible rope 42 or the like can be secured between the arm 27, by provision of an eye 43 thereon, and secured to an aft portion of the boat as shown at 44. The rope 42 maintains the support arm in its desired angular position, even if the boat is backed up over a curb or similar large obstruction, in which case the spring 28 would not so restrain the arm 27.

In launching a boat in conjunction with the chassis assembly of the present invention, the boat 12 can be moved into the water and placed afloat. Then the support arm 27 is pivoted clockwise to the position 27' shown in FIGURE 1, the rope 42 previously having been disconnected. As the arm is so positioned, the spring 28 can now move clockwise and out of engagement with the axially restraining wall member 32. The chassis can then be simply removed by pulling it axially out of the side of the boat. It will be appreciated that only a relatively small hole is exposed on each side of the boat, and there are no outwardly extending protuberances to hamper the boat's utility. Likewise, there is a minimum of obstruction on the interior of the boat. A reinforcing plate 46 is preferably mounted on the inner surface of the side 18, and serves to have the plate 34 mounted thereon, as for example by the screws 47. The plate 46 need be no larger than the stop plate 34, which has a thickness only slightly larger than the diameter of a portion of the coil spring 28. The tubular member 23 also forms only a relatively minor protuberance on the boat's interior, which may be placed under a seat in the boat.

In assembling the instant chassis, the arm 27 is positioned as shown in FIGURE 1 at 27', after which the shaft is inserted into the bore. In this position, the end portion 29 can be inserted into the easily accessible open region 48 of the recess 36. Then, as the wheel is moved counterclockwise into the solid position shown in FIGURES 1 and 3, the end portion 29 is moved likewise in the recess 36 until it engages the wall members 31 and 32. The boat is then ready to be towed out of the water.

With particular regard to a procedure used in removing a boat from the water in conjunction with mounting the wheel chassis of the present invention, the boat is moved up closely to the shore so that the trailer hitch 13 can be secured to the automobile or other draft vehicle. With the front end of the boat thereby raised, the aft portion of the boat may be afloat or supported to some extent by the ground. Then the assemblies 14 and 16 are inserted into the boat and released to a generally downwardly extending position. By then placing chocks in front of the two wheels, the boat can be pulled out of the water with the wheels engaging the chocks until they are fully pivoted to the solid line position depicted in FIGURES 1 and 3. The lines 42 are then connected, and the boat is ready to be transported over land.

It will be appreciated from the foregoing that the operation of mounting the instant chassis on to the boat is accomplished in a simple and quick manner. All the parts to be engaged are accessibly disposed on the exterior of the boat, and positive inspection can be made to assure that the spring is properly engaged.

What is claimed is:

1. In combination with a trailer, a substantially horizontally extending cylindrical tubular member mounted on a side wall of said trailer and disposed wholly within the interior of said trailer, said tubular member having an inner end wall and an outer opening providing access from the exterior of said trailer, a stub shaft removably journaled in said tubular member for rotation about its axis and having a radially enlarged portion disposed exteriorly of said tubular member, said enlarged shaft portion having an annular shoulder disposed in abutting relationship with the outer end of said tubular member to limit axially inward movement of said shaft, a wheel support arm having one end secured adjacent the outer end of said shaft and disposed generally transversely thereto, a wheel mounted for rotation on the other end of said arm, a helical spring disposed concentrically about said shaft portion, a stop member mounted adjacent said side wall substantially flush with the exterior surface thereof and defining a generally arcuate shaped recess in said side wall, said recess extending along a generally circular centerline disposed concentrically about said tubular member and in end alignment with said spring, said stop member including an end wall disposed transversely adjacent one end of said recess and a substantially radially extending wall disposed over a segment of said recess adjacent said end wall, said stop member being adapted to have the innermost end portion of said spring inserted into said recess in abutting relationship with said end wall and restrained thereby against rotation in one direction about said shaft, said radially extending wall restraining said innermost spring portion against axially outward movement relative to said trailer, and said spring having a portion adjacent its outermost end engaging said support arm for restraining said spring against rotation in the other direction about said shaft and restraining said shaft against axially outward movement relative to said trailer, said shaft thereby being resiliently restrained against rotational movement in one direction.

2. The combination of claim 1 further defined by a longitudinally extending bore disposed through said shaft.

3. The combination of claim 1 further defined by means for selectively restraining said shaft against rotational movement in an opposite direction.

4. Apparatus of the character described, comprising in combination, means defining a bore, a stub shaft removably journaled in said bore for rotation therein about its axis and having an outer portion disposed outwardly adjacent one end of said bore, a support arm extending angularly from said outer portion, a helical torsion spring disposed concentrically about said outer portion in outwardly adjacent relation to said means, means restraining the inner end portion of said spring against rotation in one direction about said shaft, said inner end portion of said spring disposed along the normal helical convolution of said spring, means retaining said spring against outward movement relative to said bore, means restraining the outer end portion of said spring against rotation in the opposite direction about said shaft, and said spring having a portion adjacent its outer end retaining said shaft against outward movement from said bore.

5. Apparatus of the character described, comprising in combination, a generally cylindrical tubular member having one open end, a plate member secured adjacent said end and disposed generally transversely relative to said tubular member, a stub shaft removably journalled in said tubular member for rotation about its axis and having an outer portion extending from said end and disposed exteriorly of said tubular member, a wheel support arm secured adjacent the outer end of said shaft, a helical spring disposed concentrically about said outer shaft portion, said plate having a generally arcuate shaped recess extending along a generally circular center line disposed concentrically about said tubular member and in end alignment with said spring, said plate having an end wall portion disposed transversely adjacent one end of said recess and a substantially radially extending wall disposed over a segment of said recess adjacent said end wall, said plate member being adapted to have the innermost end portion of said spring inserted into said recess in abutting relationship with said end wall and restrained thereby against rotation in one direction about said shaft, said radially extending wall restraining said innermost spring portion against axially outward movement relative to said tubular member, and said spring having a portion adjacent its outermost end engaging said support arm for restraining said spring against the rotation in the other direction about said shaft and restraining said shaft against axially outward movement relative to said tubular member.

6. In combination with a trailer, means defining a generally horizontally extending bore adjacent a side wall of said trailer, a stub shaft removably journalled in said bore for rotation about its axis and having an outer end portion extending outwardly from said bore, a support arm extending angularly from adjacent the outer end of said shaft and adapted for carrying ground engaging means, a helical spring disposed concentrically about said outer end portion of said shaft exteriorly of said bore, a stop member mounted adjacent said side wall substantially flush with the exterior surface thereof and defining a generally arcuate shaped recess in said side wall, said recess extending along a generally circular center line disposed concentrically about said tubular member and in end alignment with said spring, said stop member including an end wall disposed transversely adjacent one end of said recess and a substantially radially extending wall disposed over a segment of said recess adjacent said end wall, said stop member being adapted to have the innermost end portion of said spring inserted into said recess in abutting relationship with said end wall and restrained thereby against rotation in one direction about said shaft, said radially extending wall restraining said innermost spring portion against axially outward movement relative to said trailer, and said spring having a portion adjacent its outermost end engaging said support arm for restraining said spring against rotation in the other direction about said shaft and restraining said shaft against axially outward movement relative to said trailer, said shaft thereby being resiliently restrained against rotational movement in one direction.

References Cited by the Examiner

UNITED STATES PATENTS 2,865,031   12/58   Maloney _____ 9—1

A. HARRY LEVY, *Primary Examiner.*

LEO FRIAGLIA, *Examiner.*